United States Patent Office 3,515,681
Patented June 2, 1970

3,515,681
FAUJASITE IN MATRIX PARTICLES
William H. Flank, Broomall, James E. McEvoy, Morton, and George Alexander Mills, Swarthmore, Pa., assignors to Air Products and Chemicals, Inc., Philadelphia, Pa., a corporation of Delaware
No Drawing. Continuation-in-part of application Ser. No. 540,201, Apr. 5, 1966. This application Apr. 5, 1967, Ser. No. 628,518
Int. Cl. B01j *11/40;* C01b *33/26*
U.S. Cl. 252—455      3 Claims

ABSTRACT OF THE DISCLOSURE

Hydrated aluminum disilicate such as kaolin is calcined at about 1030° C. to produce reactive kaolin. Upon differential thermal analysis, said reactive kaolin shows less than 15% of the exotherm exhibited at about 980° C. by raw kaolin. The reactive kaolin is mixed with an aqueous alkaline solution so that in the mixture, the weight ratios of such reactive kaolin to water to sodium hydroxide are about 4–6:4–6:1, desirably about 4.5:5:1. This mixture is transferred to a hot aging zone, where it is maintained quiescently in the hot aging range, 80–120° C., for from five hours to five days, desirably about one day, for transforming the mixture into a faujasite-containing mass. Said faujasite-containing mass is comminuted and employed as a faujasite-contributing component. For example, cracking catalyst particles can be prepared from such comminuted faujasite in aluminosilicate matrix material.

CROSS REFERENCES TO PARENT APPLICATION

This application is a continuation-in-part of Ser. No. 540,201, filed Apr. 5, 1966 now abandoned, and all the disclosure thereof is deemed here reiterated.

DIGEST OF EXCERPTS FROM PARENT CASE

Several preparations of compositions comprising sodium faujasite in an aluminosilicate matrix were described in the parent case. Weight ratios of calcined kaolin to water to sodium hydroxide were set forth in a series of quiescent aging procedures producing a solid mass subsequently comminuted. In each preparation, the calcined reactive aluminum disilicate was dispersed in an alkaline solution, aged at a cool temperature, and then transferred to an oven (or equivalent heating system) for heating up from the cool to the hot temperature, and maintained at the hot temperature. The time necessary for the heat-up of the composition to the range of temperature at which hot-aging could occur was not set forth. In describing the placing of a cold container of composition in an oven in which air circulated at a controlled temperature, and the maintenance of the container in the oven for a prolonged time, there was a teaching that the heat-up of the composition to the oven temperature would take a portion of the total time in the oven, inasmuch as the rate of heat transfer from the air through the containers and through the sodium aluminosilicate to the core of the composition being hot-aged was not instantaneous.

In the standard procedure for quiescent aging, the composition was aged at about 37° C. for about 40 hours and then placed in an oven at about 95° C. for about 24 hours. Attempts were made to evaluate the effects of changes in the weight ratios of calcined kaolin (abbreviated as clay) to water to alkali. Some of the data from the parent case are as follows:

| Example No. | Wt. ratios of composition | | | Sodium faujasite in hot-aged composition | |
|---|---|---|---|---|---|
| | Clay | H₂O | NaOH | Percent | SiO₂/Al₂O₃ mol ratio |
| 26 | 5 | 5 | 1 | 29 | 5.09 |
| 27 | 4.55 | 4.55 | 1 | 34 | 4.65 |
| 28 | 4.55 | 5.45 | 1 | 48 | 4.52 |

As previously noted, said examples of quiescent aging to produce a solid mass subsequently comminuted required aging at about ambient temperature for about 40 hours prior to placing of the container in the oven for about 24 hours of aging at about 95° C. The original claims of said parent case indicated that a period of from 5 hours to 5 days was required for each of the two stages of aging, without any mention of any time for heat-up from cold aging to hot aging. It is convenient to measure the temperature of the heat transfer media (e.g. air) but it is difficult to discuss the temperature of a large mass having a relatively cooler core and a periphery being heated as rapidly as the heat transfer characteristics permit. Because of such difficulties, the heat-up period might be deemed a part of either or both of the two stages of aging set forth in the parent case.

Said parent application provides a generic description of a method of preparing particles having faujasite in a matrix. Finely divided dehydrated reactive aluminum disilicate particles are prepared by heating a catalytic grade of hydrated aluminum disilicate at a temperature such as 1030° C.±20° C. or 1010° C. to 1050° C. An aqueous alkaline mixture is prepared by dispersing the reactive aluminum disilicate particles in an aqueous alkaline hydroxide solution, the weight ratios of reactive aluminum disilicate to water to sodium hydroxide being from 4–6;4–10:1. Various strong hydroxides can replace at least a portion of the sodium hydroxide generally contemplated as the standard in synthesizing a faujasitic material. Such mixture is aged at 10–50° C. for from about five hours to about five days, and thereafter maintained at 80–120° C. for from about five hours to about five days to provide a hot aged composition which can be characterized as a solid sodium aluminosilicate different from the initial alkaline aqueous dispersion of calcined clay. Said solid sodium aluminosilicate contains at least 5% but less than 80% of crystalline sodium faujasite supported in an aluminosilicate matrix, the unit mole ratio of the silica to alumina in the sodium faujasite being greater than 3.5 and less than 6.

Said parent case explains that the hot-aged composition is comminuted and shaped into particles. The thus-prepared particles are treated with aqueous ammonium salt solution. The residual content of the sodium oxide equivalent is less than about 2% of the weight of the particles. The effectiveness of the particles for the catalytic cracking of petroleum fractions is superior to that of some amorphous silica-alumina cracking catalysts.

SUMMARY OF THE INVENTION

One of the improvements over the parent case consists of transferring the freshly mixed dispersion of calcined clay directly to the hot zone maintained at 80–120° C. and withdrawing a solid mass comprising sodium faujasite in an aluminosilicate matrix after a controlled period in the hot aging zone. The method is reliably reproducible when performed by technicians following routine instructions. Such reproducible method is advantageous and different from methods requiring supervision of chemists skilled in faujasite production to assure reproducibility.

One of the improvements over the preferred embodiments emphasized in the parent case consists of quiescent aging to form a solid mass of sodium aluminosilicate instead of an aqueous dispersion or slurry of hot-aged particles.

One of the improvements over the preferred embodiments emphasized in the parent case consists of employing the measurement of the exotherm at about 980° C. detected by differential thermal analysis (generally designated as DTA exotherm) as a control for evaluating calcined reactive kaolin, and employing as starting material only that which is, upon X-ray examination, amorphous and free from well-crystallized mullite (i.e., not over-calcined) and also has a DTA exotherm less than 15% of the DTA exotherm of raw kaolin (i.e., not under-calcined). As explained in the parent case, a hydrated aluminum disilicate (e.g., kaolin) is calcined at 965–1095° C., desirably 1030° C.± 20° C., to produce the reactive aluminum disilicate.

One of the improvements over the disclosure of the parent case is the discovery that factory technicians can routinely produce sodium faujasite more readily from reactive kaolin having a relatively small DTA exotherm. Because many complex variables affect the ease of control of large scale production of reactive aluminum disilicate, because many complex variables affect the ease of control of large scale production of a faujasite component from alkaline mixtures comprising reactive aluminum disilicate, and because some evidence suggests that experts could prepare faujasite experimentally throughout a wide continuum of variables, killed judgment was required in establishing limits for commercial production. Thus, it was established that the reactive kaolin desirably should have less than about 3% of the DTA exotherm of raw kaolin.

One of the improvements over the preferred embodiments of the parent case concerns the discovery that a solid mass comprising sodium faujasite in an aluminosilicate matrix can be prepared so that the composition corresponds generally to a formula of about $0.6Na_2O \cdot Al_2O_3 \cdot 2SiO_2 \cdot 14.3H_2O$, the concentration of the faujasite being within the range from about 5% to about 80% of the material analyzed. Such material is prepared by steps comprising the preparation of reactive kaolin by the calcination of raw kaolin at 965–1095° C. to provide a calcined kaolin having a DTA exotherm less than 3% of the DTA exotherm exhibited by raw kaolin and preparing a dispersion of such reactive kaolin, water and sodium hydroxide in weight ratios of about 4.5:5:1 and maintenance of said mixture quiescently at a temperature from about 80° C. to about 120° C. for from about five hours to above five days.

One of the improvements over the preferred embodiments of the parent case concerns reproducibility of the production of a solid mass comprising sodium faujasite in an aluminosilicate matrix by the preparation of a mixture of reactive kaolin, water and sodium hydroxide, the pouring of the mixture into each of a series of containers at a temperature significantly lower than the hot aging temperatures, the transfer of the containers to a hot aging zone, and the maintenance of each container in the hot aging zone for a predetermined time, so that the sodium faujasite contents of different batches of material are advantageously uniform.

An improvement of the present invention over most routes toward sodium faujasite having a high silica to alumina mol ratio concerns selectively. Other forms of zeolite are byproducts in many syntheses of sodium faujasite, so that measurement of ratios of total zeolite (as measured by base exchange capacity) to faujasite (as measured by X-ray diffraction) have been useful in evaluating procedures. During substantially all of the period during which the faujasite content increases from about 15% to about 45%, the faujasitic selectivity ratio is near unity, thus making the present method particularly suitable for operation by factory technicians.

The nature of the invention is further clarified by reference to a plurality of examples.

EXAMPLE I

An aqueous solution was prepared consisting of 5 parts of water and 1 part of sodium hydroxide corresponding to a weight concentration of 16.67% sodium hydroxide in the aqueous solution. This solution had a specific gravity at 20° C. in relation to 4° water of 1.1824. The molarity of the sodium hydroxide was 4.92, the unit molar ratio of $H_2O/NaO$ was 23.1.

A catalytic grade of kaolin (highly crystalline, extremely low iron content, moderately wide range of weights or sizes of particles) was calcined at about 1010° C. to produce a reactive kaolin exhibiting no well-defined mullite crystallinity and exhibiting a DTA exotherm about 0.5% that of the DTA exotherm of raw kaolin. A mixture was prepared from 5 parts by weight of said reactive kaolin and 6 parts of said solution of sodium hydroxide to provide clay to water to caustic weight ratios of 5:5:1. Said mixturue was placed in a polyethylene bag, supported in a beaker, covered, and placed in an oven at 95° C. for the hot aging. An X-ray analysis of a sample of the product after 24 hours of hot aging showed that no sodium faujasite had formed, and a similar result was noted after 30 hours of hot aging. After 72 hours of hot aging, the sample was removed from the oven and the thus-hardened cake was removed from the bag and comminuted. It was found by X-ray measurements that the cake contained 17% sodium faujasite having a unit mol ratio of silica to alumina of 4.3 in the faujasitic component. This material was thereafter further comminuted as a slurry in a ball mill to provide particles smaller than about 10 microns, and the slurry was mixed with sodium silicate and subjected to spray drying to form fluidizable particles. The fluidizable particles were treated with ammonium nitrate solution, then with water, and then with hot dry air for transforming them into fluidizable cracking catalyst particles having the activity expected from a catalyst containing a minor amount of faujasite.

In the parent application it is pointed out that the heating of hydrated aluminum disilicate in the 1010–1050° C. range produces a reactive amorphous aluminum disilicate which is different from what has generally been called metakaolin and different from a product in which well-crystallized mullite is readily recognized. Although the range of temperature constitutes a satisfactory definition of the preparation of the amorphous reactive aluminum disilicate, differential thermal analysis provides a supplemental measurement of the reactivity of the calcined aluminum disilicate. When raw, highly crystalline kaolin is subjected to differential thermal analysis (sometimes identified as DTA) an exotherm can be measured at about 980° C. If, prior to the DTA measurement, the kaolin has been calcined at 1150° C., no exotherm at about 980° C. is detectable. If, prior to the DTA measurement, the kaolin has been calcined at conditions somewhat more severe than the temperature range conventional in making metakaolin but less than the 965–1095° C. temperature range, an exotherm at about 980° C. which is within the range from about 30% to about 90% of the exotherm of raw kaolin might be detected but the product having the 30% to 90% exotherm is less satisfactory for industrial manufacture of cracking catalyst by factory technicians. If, prior to the DTA measurement, the kaolin has been calcined at the 500–850° C. range conventional in metakaolin manufacture, the exotherm at about 980° C. is identical to the exotherm of raw kaolin.

In order to assure advantageous reproducibility of cracking catalyst production, the calcined aluminum disilicate should not merely be amorphous (i.e., free from crystallites of mullite recognizable by routine X-ray diffraction tests) but should also have an exotherm at about 980° C. which is less than 15% of the exotherm of crystalline raw kaolin when tested by DTA procedures. The values for the percentage exotherms are determined by reference to a calibration curve for approximately the same range of concentration prepared from mixtures containing precise amounts of known components. In the event of carelessness or otherwise undetected variations in the control of the calcination of the hydrated aluminum disilicate outside the 965–1095° C., or 1010–1050° C. preferred, range, the DETA procedure which allows rejection of calcined aluminum disilicate having an exotherm greater than 15% of the exotherm of raw kaolin serves to increase the reproducibility of the cracking catalyst production method. Attempts to use calcined aluminum disilicate having an exotherm greater than 15% of that of kaolin jeopardizes product quality as well as reproducibility. Although blends of fully mullitized aluminum disilicate and metakaolin are useful in preparing calibration curves for DTA procedures, such blends lack suitability for the faujasite production method which features a properly calcined (e.g., 1010–1050° C.) kaolin identified herein as reactive aluminum disilicate.

EXAMPLE II

A procedure was followed substantially the same as that of Example I, except that the beaker was removed from the oven at the end of 96 hours, and it was established that the sodium faujasite content of the sodium aluminosilicate cake was 45% and that the unit mol ratio of silica to alumina in the faujasite component was 4.90. Such combination of high silica to alumina ratio and 45% faujasite content offers advantages to technologists concerned with the manufacture of cracking catalysts. Moreover, the selectivity ratio was high, so that the total zeolite (measured as base exchange capacity per gram) was not significantly greater than calculated from the faujasite content (measured by X-ray diffraction).

EXAMPLE III–V

In Examples III, IV and V, the amount of reactive kaolin dispersed in the 16.67% sodium hydroxide solution provided weight ratios of 4.5:5:1 instead of the 5:5:1 ratios of reactive clay to water to caustic of Examples I and II. The procedure of Example I was followed except as to duration of oven treatment. Partly by reason of the smaller proportion of clay in the alkaline slurry, the formation of faujasite advanced more rapidly. In Example III, the beaker was removed from the oven at 36 hours, and the sodium aluminosilicate cake was found to contain 32% sodium faujasite having a unit mol ratio of silica to alumina in the faujasite component of 4.3. In Example IV, the beaker was removed after 72 hours, and the sodium aluminosilicate cake was found to contain 69% sodium faujasite. In Example V, the beaker was removed from the 96° C. oven after 96 hours, and the sodium aluminosilicate cake was found to contain 72% faujasite. In each case, the ratio of faujasite to total zeolite was close enough to unity to merit the classification of the method as significantly more selective for faujasite than many methods of preparing faujasite.

EXAMPLE VI

In a pilot plant operation, a 35 gallon steel drum was lined with a removable polyethylene bag. A mixture was prepared from reactive kaolin and 16.67% sodium hydroxide solution, providing weight ratios of 4.5:5:1 for reactive kaolin/water/sodium hydroxide. The agitated slurry was poured into the polyethylene bag in the drum. The drum was transferred to a preheated oven maintained at about 96° C., and air was circulated at about 96° C., thereby slowly heating the drum and contents toward the hot aging range. The drum was covered so that no moisture absorption or evaporation of the water occurred. The total aging operation had a sufficient degree of reproducibility to permit control of each batch under the general supervision of factory technicians. Successive batches maintained in the oven for the same time provided about the same amount of faujasite having about the same silica to alumina ratios in the faujasitic component. The optimum concentration of sodium faujasite of about 35% was obtained by keeping the drums in the 96° C. oven for about 30 hours. Certain delays occurred in the transfer of heat from the hot air of the oven to the periphery and center core of the mixture in the drum. Average temperatures of the mass differed from spot temperatures of portions of the mass until the core was heated to the temperature of the mass adjacent to the polyethylene bag. During most of said 30 hours in the oven, the average temperature of the mass was in the hot aging range above 80° C. To the factory technician, the heat-up time required no measurement and, hence, was not significant.

EXAMPLE VII

A catalytic grade of kaolin was calcined in the 965–1095° C. range to provide a reactive clay which upon evaluation by Differential Thermal Analysis exhibited an exotherm at about 980° C. which was 0.3% of the DTA exotherm of raw kaolin. This reactive kaolin was mixed with aqueous sodium hydroxide to provide a weight ratio mixture of 4.5 clay:5 water:1 NaOH. Said proportions correspond to 1 mol of $Al_2O_3 \cdot 2SiO_2$, 0.6 mol of $Na_2O$, 0.6 mol of water in the NaOH component and 13.7 mols of water as liquid, providing a total of 14.3 mols of water. A propeller mixer dispersed the clay in the aqueous alkaline solution to provide a composition having a consistency comparable to pancake batter. This batter was poured into a 35 gallon drum and the drum was placed in an oven in which air was circulated at about 96° C. This drum was removed from the oven after 34 hours and the cake of sodium aluminosilicate having a composition corresponding essentially to

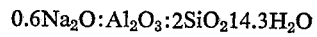

$$0.6Na_2O:Al_2O_3:2SiO_2 14.3H_2O$$

was discharged from the drum. The cake was subjected to grinding to provide a powder suitable for analysis. The presence of 41.5% sodium faujasite having a silica to alumina unit mol ratio of 5.09 in the faujasitic component was shown by X-ray diffraction. The powder had a base exchange capacity of 1.7 milli-equivalents per gram, indicating high selectivity for faujasite in the synthesis, and the substantial absence of byproduct zeolites.

The product was subjected to ball milling to the presence of water to reduce the particle size. Sodium silicate having a silica to sodium oxide weight ratio of about 3.4:1 was employed as a binder. The amount of silica binder added is about 19% of the aluminosilicate content of the ball milled slurry prior to such addition. Thus the silica added from sodium silicate constituted approximately 16% of the ultimately prepared cracking catalyst. This mixture of finely ground sodium aluminosilicate and sodium silicate was spray dried to provide particles from about 15 to 150 microns in diameter. Oversize and undersize particles were removed, and the remaining particles, in the 15 to 150 micron range, were treated for the removal of most of the sodium by a series of treatments with acid, ammonium nitrate and water, and were then dried in a drum drier to provide fluidizable cracking catalyst particles suitable for introduction into the regeneration zone and subsequent use in a fluidized cracking reactor.

The fluidizable catalyst was subjected to an attrition test and it was found that the average marginal attrition rate after prolonged attrition was at the rate of 0.16% by weight per hour, thus indicating a degree of attrition resistance superior to that of some catalysts which have been marketed as fluidizable catalysts in recent decades.

It was noted that the final catalyst contained 0.83% $Na_2O$, on an ignited basis. In testing the activity, selectivity and stability of the catalyst particles, a sample was subjected to pelleting to provide pellets suitable for processing by the CAT–D procedure described by Harriz et al in "Hydrocarbon Processing," vol. 45, No. 10, pages 183–188 of 1966. After the catalyst pellets had been subjected to artificial aging by treatment for four hours in 100% steam at a selected temperature, the catalyst permitted the cracking of gas oil under the standard test conditions as indicated in the table.

TABLE

| 4 hrs. $H_2O$ at— | Vol. percent gasoline | Wt. percent coke | Wt. percent gas | Gas grav. | Wt. percent conv. | Wt. percent gasoline selectivity |
|---|---|---|---|---|---|---|
| 815° C | 65.1 | 1.8 | 14.0 | 1.60 | 73.1 | 78.5 |
| 840° C | 53.0 | 1.4 | 9.2 | 1.48 | 57.3 | 80.5 |

Such performance of the catalyst is significantly superior to that of some cracking catalysts which have been employed in industry during recent decades.

EXAMPLE VIII

A cracking catalyst was prepared and tested following the general procedure of Example VII except as set forth. The reactive clay was calcined at conditions sufficiently severe that no DTA exotherm was observed during the evaluation thereof by the DTA procedure. A high speed impeller was employed for the mixing instead of a propeller mixer. The drum was kept in the oven for 26 hours instead of 34 hours.

After the sodium aluminosilicate cake had been discharged from the drum and pulverized, it was established that the sodium aluminosilicate contained about 27.7% sodium faujasite having a silica to alumina unit ratio of 4.97 in the faujasitic component. The base exchange capacity of the sodium aluminosilicate was about 1.2 milliequivalents per gram, indicating the substantial absence of zeolites other than faujasite, and indicating high selectivity for the synthesis.

The fluidizable catalyst had good attrition resistance, there being 0.10% by weight of attrition loss per hour. In the CAT–D tests after four hours at a selected steaming temperature, the data were as follows:

TABLE

| 4 hrs. $H_2O$ at— | Vol. percent gasoline | Wt. percent coke | Wt. percent gas | Gas grav. | Wt. percent conv. | Wt. percent gasoline selectivity |
|---|---|---|---|---|---|---|
| 815° C | 60.1 | 1.0 | 10.0 | 1.52 | 63.9 | 82.9 |
| 840° C | 56.8 | 1.2 | 9.3 | 1.56 | 60.5 | 82.9 |

The data indicate that the catalyst is superior to some catalysts described in textbooks.

EXAMPLE IX

In considering the total manufacturing operation, advantages are achieved by the use of the calcined kaolin having less than 3% DTA exotherm. Moreover, it is established that calcined kaolin having a DTA exotherm greater than about 15% of the exotherm exhibited by raw kaolin is unsatisfactory from a manufacturing standpoint for cracking catalyst production.

By a series of tests, it is established that the temperature pattern prior to the hot aging range of 80 to 120° C. can be varied significantly without destroying the sodium faujasite potentialities of the system. For example, the components can be mixed and maintained at 60° C. for 3 hours prior to transfer to the hot aging oven maintained at about 95° C., and withdrawn from the oven after about 30 hours to provide an intermediate material containing sodium faujasite. By a series of tests, it is established that the reactive clay having a DTA exotherm less than about 3% of the exotherm exhibited by raw kaolin should be mixed with aqueous alkaline solution at a temperature significantly lower than the 80–120° C. range for the hot aging.

Various modifications of the invention are possible without departing from the scope of the appended claims, so that the examples are to be interpreted as illustrative embodiments of the invention rather than as limitations.

The invention claimed is:

1. In the method of preparing catalyst particles comprising faujasic material in an aluminosilicate matrix the improvement which consists of: heating finely divided hydrated aluminum disilicate particles at a temperature within the range from about 1010° C. to 1050° C. to produce reactive aluminum disilicate having, upon thermal analysis, a Differential Thermal Analysis exotherm which is less than 3% of the exotherm of raw kaolin; preparing a mixture of the reactive aluminum disilicate and an aqueous alkaline hydroxide solution, the concentration of aluminum disilicate in relation to the water and alkaline hydroxide in the aqueous clay mixture being controlled to provide a weight ratio of aluminum disilicate to sodium hydroxide equivalent in the range from about 4:1 to about 6:1 and the amount of water present during the aging steps being controlled to provide a weight ratio of water to sodium hydroxide equivalent in the range of about 4:1 to about 10:1, said alkaline hydroxide being selected from the group consisting of sodium hydroxide and mixtures of sodium hydroxide with at least one of the group lithium hydroxide, magnesium hydroxide, potassium hydroxide, lower alkyl quaternary ammonium hydroxide, and calcium hydroxide, any alkaline hydroxide other than sodium hydroxide being deemed to increase stoichiometrically the weight of sodium hydroxide, such adjusted amount of sodium hydroxide being designated as the weight of sodium hydroxide equivalent, said mixing of reactive clay, water and sodium hydroxide equivalent being conducted at temperatures significantly cooler than 80° C.; transferring said mixture to a zone having air circulating at a temperature from about 80° C. to 120° C. and maintaining said mixture in such zone for from about 5 hours to 5 days to provide a hot-aged composition; employing said hot-aged composition as the sodium faujasite-containing component in the production of particles having sodium faujasite in an aluminosilicate matrix; ion-exchanging said particles with an aqueous ammonium salt solution, and heating the ammonium-exchanged particles to provide catalyst particles.

2. The method of claim 1 in which the hot aging is conducted at about 95° C. for about 30 hours.

3. In the method of preparing sodium faujasite in a sodium aluminosilicate matrix by steps comprising calcination of kaolin and treatment of calcined kaolin with an alkaline component, the improvement which consists of the combination of the steps of: calcining kaolin above 965° C. and below 1095° C. to provide a reactive kaolin exhibiting a Differential Thermal Analysis exotherm which is less than 3% of the exotherm of raw kaolin; preparing at a temperature significantly cooler than 80° C. a mixture of aqueous alkaline solution and said reactive kaolin in which the weight proportions are about 4.5 parts of reactive kaolin to about 5 parts of water to about 1 part of sodium hydroxide equivalent; then transferring said composition to a hot aging zone maintained at a temperature from about 80° C. to about 120° C. and maintaining said mixture quiescently in said hot aging zone for from about 1 to about 2 days until the desired concentration of sodium faujasite has developed.

(References on following page)

References Cited

UNITED STATES PATENTS

| | | | |
|---|---|---|---|
| 3,341,284 | 9/1967 | Young | 252—455 X |
| 3,367,886 | 2/1968 | Haden et al. | 252—455 |
| 3,391,994 | 7/1968 | Haden et al. | 23—112 |

DANIEL E. WYMAN, Primary Examiner

C. F. DEES, Assistant Examiner

U.S. Cl. X.R.

23—112

PO-1050
(5/69)

UNITED STATES PATENT OFFICE
CERTIFICATE OF CORRECTION

Patent No. 3,515,681      Dated June 2, 1970

Inventor(s) William H. Flank et al

It is certified that error appears in the above-identified patent and that said Letters Patent are hereby corrected as shown below:

Column 2, line 38 - "4-6;4" should read -- 4-6:4 --.

Column 6, line 57 - the second "to" should read -- in --.

Column 8, line 16 - "faujasic" should read --faujasitic --.

SIGNED AND
SEALED
OCT 13 1970

(SEAL)
Attest:
Edward M. Fletcher, Jr.
Attesting Officer

WILLIAM E. SCHUYLER, JR.
Commissioner of Patents